United States Patent [19]

Renaud

[11] Patent Number: 4,726,008
[45] Date of Patent: Feb. 16, 1988

[54] OPTICAL DISK ASSEMBLY
[75] Inventor: John E. Renaud, Cambridge, N.Y.
[73] Assignee: Eastman Kodak Company, Rochester, N.Y.
[21] Appl. No.: 920,555
[22] Filed: Oct. 20, 1986
[51] Int. Cl.⁴ ............................................... G11B 7/26
[52] U.S. Cl. ..................................................... 369/286
[58] Field of Search ........................ 369/283, 284, 286

[56] References Cited
U.S. PATENT DOCUMENTS

| | | | |
|---|---|---|---|
| 4,519,061 | 5/1985 | Dahrecke et al. | 369/284 |
| 4,536,868 | 8/1985 | Langé et al. | 369/284 |
| 4,539,673 | 9/1985 | Winslow | 369/284 |
| 4,564,932 | 1/1986 | Langé | 369/284 |
| 4,644,520 | 2/1987 | Langé | 369/286 |

Primary Examiner—Steven L. Stephan
Attorney, Agent, or Firm—Warren W. Kurz

[57] ABSTRACT

Disclosed herein is an optical disk assembly of the type comprising a transparent plastic cover sheet which overlies, and protects from contamination, an optical recording media disposed on a substrate. Plastic spacer means are provided for spacing the cover sheet from the recording media. To avoid the disadvantages attendant the use of adhesives, the cover sheet is fused to the spacer means such as by a laser welding technique.

8 Claims, 5 Drawing Figures

OPTICAL DISK ASSEMBLY

BACKGROUND OF THE INVENTION

The present invention relates to the field of optical recording and, more particularly, to improvements in optical disk assemblies of the type in which an optically recordable and/or readable information storage medium is protected from degradation and contamination by a transparent cover sheet.

In the June 24, 1984 issue of Research Disclosure, Vol. No. 242, Item 24223, entitled, "Rigid Optical Disks", a variety of optical disk structures are disclosed for recording information in the form of tiny pits (e.g. one micron in size) in the surface of a laser write/read (LWR) layer. In the two-sided embodiment shown and described with reference to FIGS. 11–13, the recording assembly comprises a rigid, disk-shaped aluminum substrate having an LWR layer disposed on each of its opposing planar surfaces. Each of the LWR layers is protected from degradation and contamination by a thin (e.g. 75–150 microns) transparent plastic cover sheet. Each of the cover sheets is radially tensioned and spaced above its underlying LWR layer by a plastic perimeter ring which surrounds the periphery of the disk substrate, and by a smaller plastic ring concentrically arranged within the larger perimeter ring, between the LWR layer and the cover sheet. The inner ring is adhesively bonded to the disk substrate whereas the outer ring is dimensioned to have a slight interference fit with the substrate periphery. A U-shaped groove, formed in the inside wall of the perimeter ring, engages a similarly contoured chamfered surface of the substrate periphery to center the ring with respect to the substrate plane. While in the state of tension, the cover sheets are bonded to the opposing parallel surfaces of the perimeter ring, and to the radially inner plastic rings. The thickness of these rings and the tension in the cover sheets control the spacing between the LWR layer and its associated cover sheet. By virtue of the interference fit between the perimeter ring and substrate periphery, the perimeter ring has a certain degree of freedom to move in order to balance the tensioning forces exerted on the cover sheets.

As noted in the above Research Disclosure, the cover sheet/LWR layer spacing and tension are critical to the performance of the optical disk structure. Ideally, the cover sheet should be perfectly parallel to and closely spaced from its underlying LWR layer during use of the disk. Unavoidably, however, owing to the flexibility and low mass of the cover sheet, centrifugal forces acting on the air mass in the space separating the cover sheet and LWR layer produce a so-called "ballooning" effect. That is, during high speed rotation of the disk, the resulting centrifugal forces act to move the trapped air mass radially outwardly, causing the cover sheet to collapse towards the LWR layer in the central portion of the disk, and to bulge outwardly from the LWR layer at the outer portions of the disk. Physical contact between the cover sheet and LWR layer can produce catastrophic results in terms of lost data. Similarly, contact between the cover sheet and the high numerical aperture lens used to form the write/read beam on the LWR layer can damage the recording element. Thus, it is necessary to accurately control the cover sheet tension and spacing during the manufacturing process.

In the aforementioned Research Disclosure, it is proposed that the cover sheet and perimeter ring be bonded together by either ultraviolet or electron-beam-curable adhesives. While it is, indeed, possible to produce a uniform tension in the cover sheet, as well as effective seals between the cover sheet and its spacer rings, by using such adhesives, there are certain disadvantages associated with adhesives. Not only are they difficult to apply with the precision and uniformity required by high performance optical disk structures, but also they have a tendency to degrade with age, thereby causing a reduction in cover sheet tension over time. This tension reduction, of course, accentuates the aforementioned ballooning problem; furthermore, it gives rise to optical imaging problems which affect focus maintenance, tracking and data readout.

SUMMARY OF THE INVENTION

In view of the foregoing discussion, an object of the invention is to provide an improved optical disk assembly of the above type, one which is both simpler to fabricate and less susceptible to the above-noted disadvantages of prior art devices.

According to the present invention, there is provided an optical disk assembly which, like prior art devices, comprises (a) a rigid disk-shaped substrate having a planar surface supporting an optical information storage medium, (b) a flexible, disk-shaped cover sheet concentrically overlying the substrate, such cover sheet being substantially transparent to radiation used to record and/or playback information on the disk, and (c) spacer means for spacing the cover sheet from the medium, such spacer means comprising a perimeter ring which is coupled to the periphery of the substrate and bonded to the cover sheet. In contrast with prior art devices, however, the optical disk structure of the invention is characterized in that the cover sheet is non-adhesively sealed to the perimeter ring (and preferably to an interior spacer ring as well) by fusion of the cover sheet and ring materials. Such fusion is preferably produced by a laser welding process. Preferably, the cover sheet and spacer rings are made of a thermoplastic material (e.g. polycarbonate), and, to facilitate the fusion of these materials by laser welding, the plastic material of the spacer rings is doped with a radiation-absorbing (at the laser welding wavelength) material, such as carbon.

The invention and its various advantages will become more apparent to those skilled in the art from the ensuing detailed description of preferred embodiments, reference being made to the accompanying drawings.

DETAILED DESCRIPTION OF PREFERRED EMBODIMENTS

Figure 1:
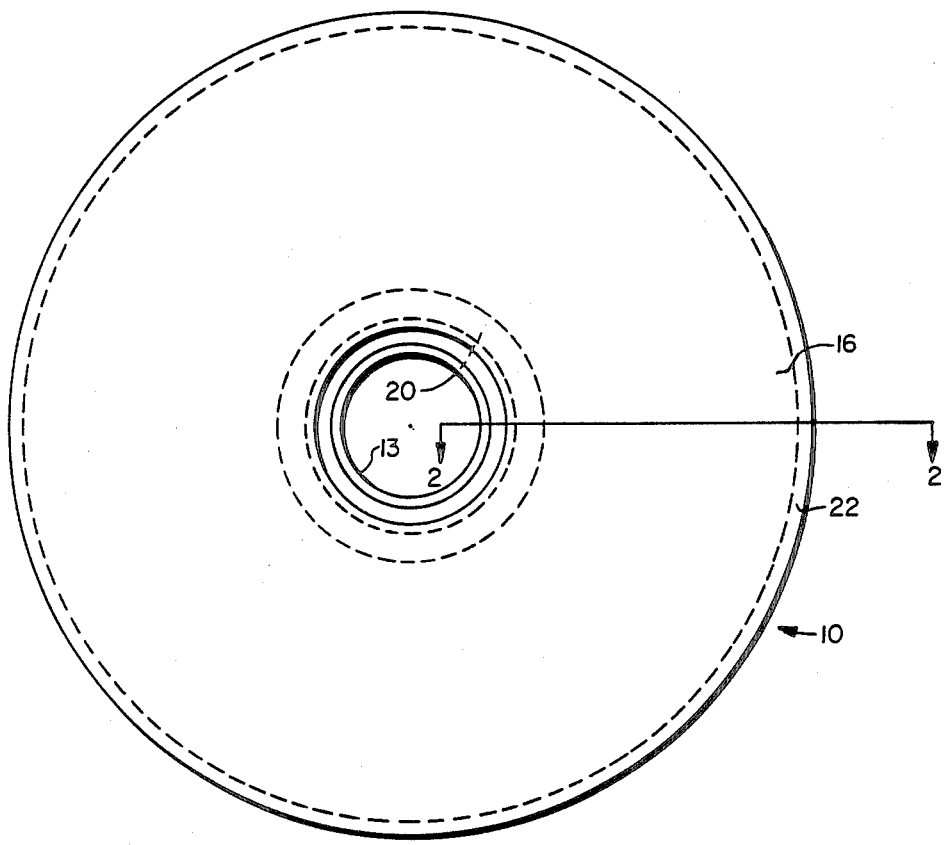
FIG. 1 is a top view of the optical recording element embodying the invention.
Figure 2:
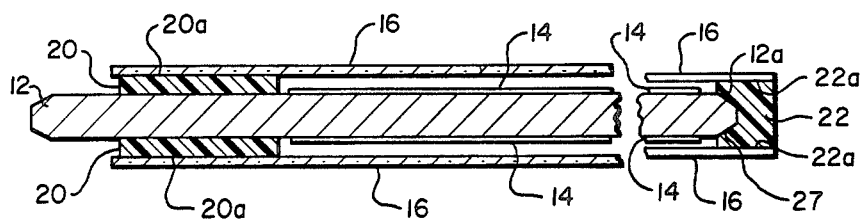
FIG. 2 is a cross-sectional view of the FIG. 1 recording element taken along the section line 2—2.

Referring now to the drawings, FIGS. 1 and 2 illustrate an optical recording element 10 comprising a relatively thick (e.g. 1.8 mm) metal substrate 12 (e.g. aluminum) having optical recording media 14 disposed on opposite sides thereof. Substrate 12 has a circular configuration, a central aperture 13 being provided at its central region to receive a rotably driven spindle (not shown). Media 14 may comprise any of a variety of different optical recording materials known in the art, and its specific composition is non-essential to the invention. A pair of transparent cover sheets 16 serves to protect the recording media from dirt and scratches, yet allowing information to be written thereon and retrieved therefrom. Cover sheets 16 preferably comprise a thin (e.g. 0.075–0.175 mm.) flexible film of plastic, preferably polycarbonate, which is transparent to the wavelength(s) of the writing and reading laser beam(s). Preferred cover sheet material is substantially non-birifringent, substantially homogeneous, and free from striae and occulisions.

Transparent cover sheets 16 are spaced from their underlying recording media by a circular inner spacer 20 which is concentrically arranged relative to aperture 13, and an outer perimeter ring 22, described in more detail below. Inner spacer 20 and perimeter ring 22 preferably comprises the same material as that of the cover sheet, e.g. polycarbonate, but unlike the cover sheet material, the spacer and perimeter ring material is non-transparent, being doped with carbon or the like to render such material highly absorbing to the laser energy ultimately used to fuse the cover sheets to the spacer and perimeter ring, as described below.

As shown in FIG. 2, spacer 20 is dimensioned to provide a cover sheet/media spacing which is somewhat greater than that provided by the perimeter ring. Thus, the cover sheet is canted relative to the underlying substrate. Preferably spacer 20 has a thickness of being about 0.70 mm., whereas the spacing provided by the perimeter ring is only about 0.25 mm. The spacer ring maybe bonded to the disk substrate by a heat-activated adhesive.

Perimeter ring 22 defines an interior channel 27 which is contoured to the shape of the chamfered periphery 12a of substrate 12. Positioning of the perimeter ring on the substrate periphery is achieved by heating the perimeter ring to produce thermal expansion thereof, and subsequently cooling the ring after it is fitted about the substrate periphery. Each of the cover sheets is non-adhesively bonded to the opposing planar surfaces 22a of the perimeter ring, and to the respective outer planar surfaces 20a of spacer ring 20 in the manner described below.

Figure 3:
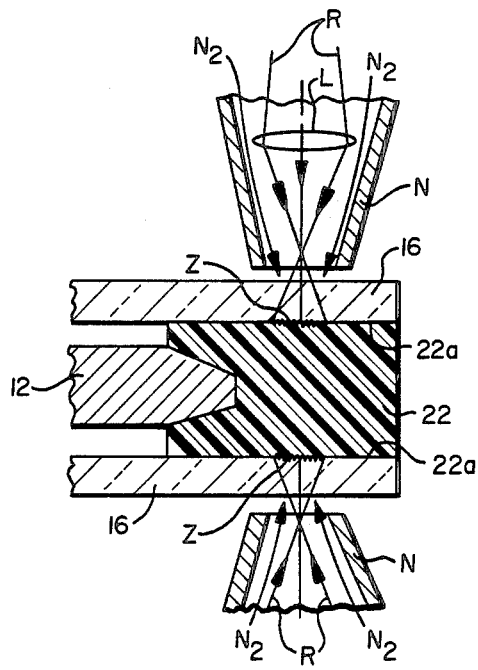
FIG. 3 is an enlarged view of the FIG. 2 cross-section.

According to the present invention, cover sheets 16 are fused with their underlying planar surfaces 20a and 22a, preferably by a laser welding process. By momentarily raising the temperature of the interface between the cover sheet and spacer ring materials to a temperature exceeding the melting temperature of these materials, the materials flow together and fuse upon cooling. As shown in FIG. 3, the fusion zone Z, which extends completely around the perimeter ring, extends over a relatively wide band, preferably being about 0.75 mm in width. Fusion is preferably accomplished with a neodymium-doped yttrium-aluminum-garnet (YAG) laser operating in a continuous wave mode and emitting at about 1.064 microns. Since polycarbonate is relatively transparent at such wavelength, it is desirably to dope the polycarbonate material from which rings 20 and 22 are fabricated with an absorbing material. As indicated above, carbon is particularly preferred as dopant, the concentration being about 1% by weight. Such doping also serves to reduce the laser energy requirement to achieve fusion between the cover sheet and rings 20 and 22. As shown in FIG. 3, laser radiation R is focused by a lens L at point above the cover sheet surface so that a defocused spot occurs at the cover sheet/ring interface. The diameter of the defocused spot is slightly larger than the desired width of the fusion zone Z. To provide good contact between the cover sheet and its underlying spacer rings during the laser welding operation, a gas, such as nitrogen or air, is directed at the fusion site. Such gas is emitted by a nozzle N through which the laser energy also passes. Such gas also assists in dissipating the thermal energy at zone Z through the balk of the cover sheet.

Figure 4:
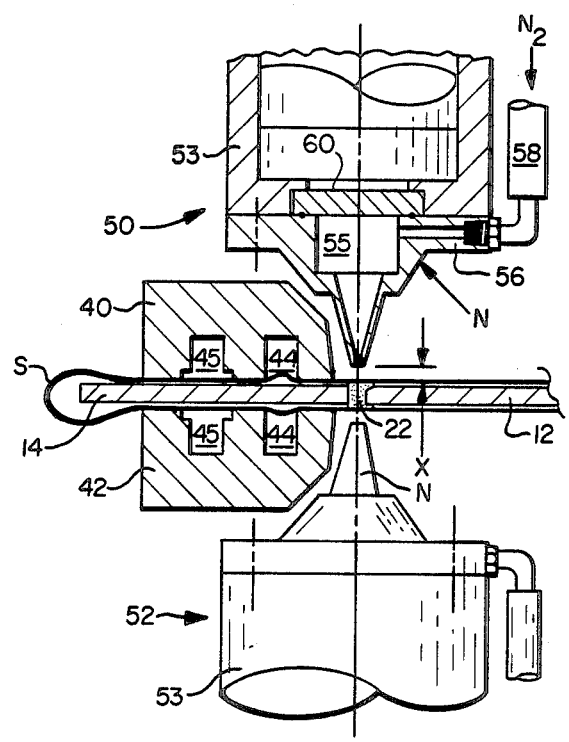
FIG. 4 is a cross sectional schematic drawing of a laser welding apparatus.

Referring now to FIG. 4, laser welding apparatus for fusing the transparent plastic cover sheets S to their respective underlying spacers is shown to comprise a pair of tensioning rings 40 and 42, and a pair of laser welding heads 50 and 52. The apparatus depicted is adapted to simultaneously fuse two cover sheets to the opposing planar surfaces of the perimeter ring 22 (or inner spacer ring which is not shown). It will be understood, of course, that in the case of a one-sided optical disk only one welding head and tension ring are necessary. Each tensioning ring defines inside and outside concentric channels, 44 and 45, respectively, each being selectively coupled to a vacuum source (not shown). Each of the laser welding heads comprises a housing 53 which houses a lens system (not shown) for focusing a laser beam, and defines chamber 55 which contains pressured gas (e.g. nitrogen) supplied to it via a conduit 56 from a gas supply 58. Chamber 55 communicates with a nozzle N which is arranged to direct gas within the chamber in the direction of the welding zone Z (See FIG. 3). A preferred spacing between the tip of nozzle N and the cover sheet to be welded is between 2 and 3 mm. A window 60, transparent to radiation of the welding laser wavelength partially defines chamber 55 and confirms the cooling gas to the nozzle region of the housing. The welding apparatus will be better understood by the description of its operation which follows.

Figure 5:
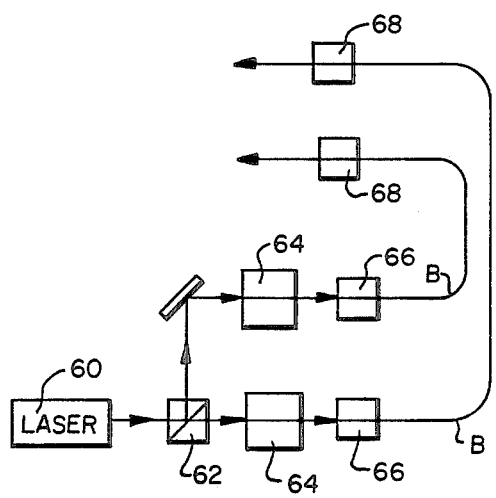
FIG. 5 is a block diagram of an apparatus for laser welding a cover sheet to an underlying support.

In operation, an optical disk substrate having an optical recording media thereon is supported by a substrate holder 14 which frictionally engages the outer edge of the perimeter ring 22. A rectangular sheet S of the cover sheet material is placed on tensioning rings 40 and 42. At this time, a vacuum is drawn in the respective outer channels 45 of these rings. Upon clamping the cover sheet to the tensioning ring surface, a second vacuum is drawn in inner channel 44, such vacuum serving to draw the cover sheet into the channel, as shown, and to exert a desired tensioning force on the sheet. Substrate holder 14 is placed in intimate contact with tensioning ring 42 which is stationary. Tensioning ring 40 is pivoted into intimate contact with the opposing side of substrate holder 14 thus yielding a cover sheet which is stretched over the opposing planar surfaces of the perimeter ring 22. The laser welding heads are then moved into place (FIG. 4). Upon being energized, the welding heads are moved in a circular path to achieve welding in a band about 0.75 mm in width around the spacer rings. To facilitate the requisite movement of the welding heads, the heads are coupled to a single, stationary laser source by a fiber optic arrangement, as shown in FIG. 5. Laser energy from a YAG laser 60 is split into two beams by a polarizing beam splitter PBS. The intensity of each beam is controlled by variable attenuators before being coupled to a fiber optic strand B via a conventional coupling device 66. In the welding head, the laser energy is decoupled from the fiber bundle by an output coupler 68 and then brought to focus by the head's lens system. After fusion of the cover sheet to its spacer rings, the disk assembly is removed from the substrate holder 14, and the excess cover sheet extending radially outwardly of the perimeter ring is trimmed away.

As stated above, fusion of the cover sheet to the spacer rings 20 and 22 totally eliminates the problems attendant the use of adhesives. The technical effect is a longer lasting and more reliable bond, thereby rendering the disk more useful over a longer period of time and more widely varying environmental conditions.

While the invention has been described with particular reference to a preferred embodiment, various alternatives and modifications will be self-evident to those skilled in the art, and such alternatives and modifications as fall within the spirit of the invention are intended to be embraced by the following claims.

I claim:

1. An optical recording element comprising (a) a rigid, disk-shaped substrate having a planar surface supporting an optical storage medium, (b) a disk-shaped cover sheet concentrically overlying said substrate, said cover sheet being substantially transparent to radiation used to record and/or playback information on optical storage medium, and (c) spacer means for spacing said cover sheet from said medium, said spacer means being arranged about the periphery of said substrate and fused to said cover sheet by the application of laser energy at a predetermined wavelength, said cover sheet comprising a thermoplastic material which is substantially transparent at said predetermined wavelength, and said spacer means comprising a thermosplastic material which is substantially less transparent at said predetermined wavelength than said cover sheet.

2. The invention as defined by claim 1 wherein said cover sheet and perimeter ring comprise polycarbonate, and wherein the polycarbonate of said perimeter ring is carbon-loaded to enhance its absorptivity at said predetermined wavelength.

3. The invention as defined by claim 1 wherein said spacer means further comprises a thermoplastic spacer member concentrically arranged with respect to said perimeter ring, said member being adhesively bonded to the central portion of said substrate and laser welded to said cover sheet.

4. An optical recording element comprising a rigid, disk-shaped substrate having opposing planar surfaces, each of said surfaces supporting an optical information storage medium, a thermoplastic perimeter ring frictionally engaging the periphery of said substrate, said perimeter ring having a pair of opposing planar surfaces, a pair of flexible, disk-shaped cover sheets concentrically arranged on opposite sides of said substrate, said cover sheets being laser welded to the opposing planar surfaces of said perimeter ring, said ring serving to radially tension and space said cover sheets from the storage medium disposed on the opposing planar surface of said substrate, each of said cover sheets comprising a thermoplastic material, the thermoplastic material of said perimeter ring having a substantially greater absorptivity at a laser welding wavelength than the thermoplastic material of said cover sheets.

5. The invention as defined by claim 4 wherein said cover sheets and perimeter ring comprise polycarbonate, and wherein the polycarbonate of said perimeter ring is doped with a material which absorbs radiation at the laser welding wavelength.

6. The invention as defined by claim 5 further comprising a pair of thermoplastic spacer members for spacing said cover sheets further from said substrate at the central portion of said substrate than at the periphery of said substrate, said central spacer members being positioned between said cover sheets and said substrate at the central portion of said substrate, each of said spacer members comprising a thermoplastic material and being laser welded to said cover sheets.

7. A method for making an optical recording element of the type comprising a rigid, disk-shaped substrate which supports an optical recording layer, and a flexible, transparent cover sheet spaced from such recording layer, said method comprising the steps of:
   (a) disposing a thermoplastic ring about the perimeter of a rigid, disk-shaped substrate, such ring having a planar surface extending above the substrate surface;
   (b) concentrically arranging a flexible, transparent cover sheet with respect to said substrate, said cover sheet comprising a thermoplastic material;
   (c) stretching said cover sheet over said ring to radially tension said cover sheet and thereby space said cover sheet from said substrate; and
   (d) laser welding said cover sheet to the planar surface of said ring while said cover sheet is in a tensioned state.

8. The method as defined by claim 7 wherein said cover sheet is more transparent than said ring at a laser welding wavelength, and wherein said laser welding step comprises the step of applying laser radiation to the ring/cover sheet interface through the cover sheet while directing a cooling gas onto said cover sheet.

* * * * *